US00RE43356E

(19) United States
(12) Reissued Patent
Kim

(10) Patent Number: US RE43,356 E
(45) Date of Reissued Patent: May 8, 2012

(54) SYSTEM FOR DETERMINING POSITION OF MOBILE COMMUNICATION TERMINAL AND METHOD THEREOF

(75) Inventor: Hyong-Won Kim, Seoul (KR)

(73) Assignee: LG Electronics Inc., Seoul (KR)

(21) Appl. No.: 11/255,237

(22) Filed: Oct. 21, 2005

Related U.S. Patent Documents

Reissue of:
(64) Patent No.: 6,636,176
Issued: Oct. 21, 2003
Appl. No.: 10/024,287
Filed: Dec. 21, 2001

(30) Foreign Application Priority Data

Dec. 26, 2000 (KR) ..... 2000-81711

(51) Int. Cl.
*G01S 19/46* (2010.01)
*G01S 19/48* (2010.01)
*G01S 19/09* (2010.01)

(52) U.S. Cl. ..... 342/357.29; 342/357.31; 342/357.46

(58) Field of Classification Search ..... 342/357.01, 342/357.03, 357.06, 357.09, 357.14, 357.25, 342/357.29, 357.31, 357.44, 357.46; 701/213–215
See application file for complete search history.

(56) References Cited

U.S. PATENT DOCUMENTS

| | | | |
|---|---|---|---|
| 5,619,211 | A | 4/1997 | Horkin et al. |
| 5,786,773 | A | 7/1998 | Murphy |
| 5,815,538 | A | 9/1998 | Grell et al. |
| 5,982,324 | A | 11/1999 | Watters et al. |
| 6,072,428 | A | 6/2000 | Schipper et al. |
| 6,324,473 | B1 | 11/2001 | Eschenbach |
| 6,430,416 | B1 | 8/2002 | Loomis |
| 6,449,485 | B1 | 9/2002 | Anzil |

FOREIGN PATENT DOCUMENTS

| | | | |
|---|---|---|---|
| JP | 9-304501 | A | 11/1997 |
| KR | 10-1999-0024521 | A | 4/1999 |
| KR | 10-0341801 | B1 | 3/2000 |
| KR | 10-2000-0056429 | A | 9/2000 |
| KR | 10-2000-0072578 | A | 12/2000 |

*Primary Examiner* — Dao L Phan
(74) *Attorney, Agent, or Firm* — McKenna Long & Aldridge LLP

(57) ABSTRACT

A position determination system of a hybrid method, which is capable of complementing the problems of a position determination method, in which a global positioning system (GPS) is used, and a position determination method, in which a mobile communication signal is used, by combining the above two methods with each other, is provided. Also, it is possible to improve the reliability and the correctness in determining the position of a mobile communication terminal using a dispersing type hybrid position calculation method and a centralized hybrid position calculation method.

32 Claims, 4 Drawing Sheets

SYSTEM FOR DETERMINING POSITION OF MOBILE COMMUNICATION TERMINAL AND METHOD THEREOF

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a system for determining the position of a mobile communication terminal, and more particularly, to an apparatus for determining the position of the mobile communication terminal, in which a satellite signal and a mobile communication signal are used, and a method therefor.

2. Description of the Background Art

A conventional method for determining the position of a mobile communication terminal (hereinafter, a mobile terminal) is divided into a method, in which a global positioning system (GPS) is used, and a method, in which a mobile communication signal is used. According to the method, in which the GPS is used, the position of the mobile terminal is calculated using a GPS satellite signal. According to the method, in which the mobile communication signal is use, the position of the mobile terminal is calculated by measuring the reception angle and the delay time of a signal delivered by the mobile terminal.

FIG. 1 shows a conventional position determination system, in which the GPS is used.

As shown in FIG. 1, the conventional position determination system, in which the GPS is used, includes a mobile terminal 101, in which a GPS engine 101a is loaded, a base station 102 for transmitting data to and receiving data from the mobile terminal 101, a GPS receiver 105 for receiving the transmission signal of a GPS satellite 104 and outputting the error compensation data of the GPS satellite signal and information related to the GPS satellite 104 such as a satellite number, a satellite orbit, Doppler information, and a navigation message, and a position calculation server 106 for transmitting the error compensation data and the satellite information that are output from the GPS receiver 105 to the mobile terminal 101 and calculating the position of the mobile terminal 101 using the pseudo range transmitted from the mobile terminal 101 through a network 103.

The operation of the conventional position determination system, in which the GPS is used, of the above structure will now be described with reference to the attached drawings.

The GPS engine 101a that is built-in the mobile terminal 101 requests the GPS satellite information to the position calculation server 106 through the base station 102 and the network 103.

At this time, the GPS receiver 105 connected to the position calculation server 106 receives the transmission signal of the GPS satellite 104, measures data for correcting the error included in the GPS satellite signal and the GPS satellite information such as a satellite orbit parameter, the Doppler information, and the navigation message, and periodically outputs the data and the GPS satellite information to the position calculation server 106.

When the GPS satellite information is requested by the GPS engine 101a, the position calculation server 106 transmits the GPS satellite information stored in a database (DB) to the GPS engine 101a through the network 103 and the base station 102. The GPS engine 101a calculates the pseudo range between the mobile terminal 101 and the GPS satellite using the transmitted GPS satellite information such as a receivable satellite number, the satellite orbit parameter, the Doppler information, and the navigation message, measures the time information of the GPS satellite signal, and transmits the pseudo range and the time information to the position calculation server 106 together with a position calculation request signal.

Therefore, according to the position calculation request of a mobile terminal 301, the position calculation server 106 corrects the pseudo range using the error correction data stored in the DB and calculates the position of the mobile terminal 101 using a triangular survey.

FIG. 1 shows the conventional position determination system, in which the mobile communication signal is used.

As shown in FIG. 1, the conventional position determination system, in which the mobile communication signal is used, includes a plurality of signal measuring apparatuses 202-1 installed in a base station 202, the signal measuring apparatuses 202-1 for measuring the reception angle and the delay time of the signal transmitted from a mobile terminal 201, a mobile communication signal server 204 for storing the reception angle and the delay time of the mobile communication signal transmitted by the signal measuring apparatuses 202-1, and a position calculation server 205 for reading the reception angle and the delay time of the mobile communication signal from the mobile communication signal server 204 according to the request of the mobile terminal 201, to thus calculate the position of the mobile terminal 201.

The operation of the conventional position determination system, in which the mobile communication signal is used, of the above structure will now be described.

The signal measuring apparatuses 202-1 receive the transmission signal of the mobile terminal 201, measure the reception angle and the delay time of the transmission signal, and transmit the measured reception angle and delay time together with identifier information and reference time information. At this time, times between the signal measuring apparatuses 202-1 must be synchronized.

Therefore, the mobile communication signal server 204 receives the reception angle and the delay time from the signal measuring apparatuses 202-1 through a network 203 and stores the reception angle and the delay time by mobile terminals, measuring times, and signal measuring apparatuses (or base stations).

When the position of the mobile terminal 201 requests the position calculation server 205 to calculate the position thereof, the position calculation server 205 obtains the reception angle and the delay time of the mobile communication signal from the mobile communication signal server 204 and calculates the position of the mobile terminal 201.

In general, according to the conventional position determination method, in which the GPS is used, it is possible to calculate the correct position of the mobile terminal only when four or more GPS satellite signals are received due to a time error during the triangular survey. In the downtown, it is possible to measure only a small number of GPS satellite signals because there exist various elements that deteriorate the visibility of the GPS satellite signal such as skyscrapers. In particular, it is not possible to smoothly receive the GPS satellite signal inside buildings, where the GPS satellite cannot be seen. Therefore, according to the conventional position determination method, in which the GPS is used, the position of the mobile terminal cannot be correctly determined in the downtown or inside the buildings.

According to the conventional position determination method, in which the mobile communication signal is used, it is possible to calculate the correct position only when the reception angle and the delay time of the mobile communication signal are received from three or more signal measuring apparatuses. In the downtown, it is possible to easily receive the mobile communication signal from three or more signal measuring apparatuses because there exist a large number of base stations. However, in a highway and the country, it is not possible to smoothly receive the mobile communication signal because there exist a small number of base stations. Therefore, according to the conventional position determination method, in which the mobile communication signal is used, it is not possible to determine the position of the mobile terminal in the highway and the country.

Also, in the downtown, errors increase in processes of propagating the transmission signal of the mobile communication signal because the transmission signal propagates through multiple paths. Therefore, in the downtown, more errors are found in the conventional position determination method, in which the mobile communication signal is used, than in the position determination method, in which the GPS is used.

SUMMARY OF THE INVENTION

Therefore, an object of the present invention is to provide a system for determining the position of a mobile communication terminal, which is capable of correctly determining the position of a mobile terminal in all of the areas, and a method therefor.

Another object of the present invention is to provide a system for determining the position of the mobile communication terminal, which is capable of providing various geographical information services as well as of calculating the position of the mobile terminal, and a method therefor.

To achieve these and other advantages and in accordance with the purposes of the present invention, as embodied and broadly described herein, there is provided a system for determining the position of a mobile communication terminal, comprising a global positioning system (GPS) engine built-in a mobile terminal, the GPS engine for measuring a pseudo range between a GPS satellite and the mobile terminal, a signal measuring apparatus for measuring the reception angle and the delay time of a mobile communication signal, and a position calculation server for calculating the position of the mobile terminal using the pseudo range corrected by the error correction data of a GPS satellite signal and the reception angle and the delay time of the mobile communication signal.

There is provided a system for determining the position of a mobile terminal, comprising a mobile terminal, in which a GPS engine is loaded, a signal measuring apparatus for measuring the reception angle and the delay time of a mobile communication signal, a GPS receiver for receiving the transmission signal of a GPS satellite and measuring the error correction data and the GPS satellite data of a GPS satellite signal, a pseudo range corrector for correcting the pseudo range measured by the GPS engine using the error correction data, a first position calculator for calculating the position of the mobile terminal by the corrected pseudo range, a second position calculator for calculating the position of the mobile terminal using the reception angle and the delay time of the mobile communication signal, and a position calculation filter for calculating the optimal position of the mobile terminal on the basis of the calculation results of the first and second position calculators.

There is provided a method for determining the position of a mobile communication terminal, comprising the steps of receiving a pseudo range between a GPS satellite and a mobile terminal, receiving the reception angle and the delay time of a mobile communication signal, correcting the pseudo range using the error correction data of a GPS satellite signal, and calculating the position of the mobile terminal using the corrected pseudo range and the reception angle and the delay time of the mobile communication signal.

There is provided a method for determining the position of a mobile communication terminal, comprising the steps of (a) receiving a pseudo range between a GPS satellite and a mobile terminal, (b) receiving the reception angle and the delay time of a mobile communication signal, (c) correcting the pseudo range using the error correction data of a GPS satellite signal, (d) calculating the position of the mobile terminal using the corrected pseudo range, (e) calculating the position of the mobile terminal using the reception angle and the delay time of the mobile communication signal, (f) calculating the optimal position of the mobile terminal on the basis of the calculation results obtained by the steps (d) and (e), and (g) matching the final position calculation result to the geographical data and generating position information for providing geographical information services.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

A preferred embodiment of the present invention will now be described with reference to the attached drawings.

A position determination system of a hybrid method, which is capable of complementing the problems of a position determination method, in which a global positioning system (GPS) is used, and a position determination method, in which a mobile communication signal is used, by combining the above two methods with each other. Also, in order to improve the reliability and the correctness of the position determination, a dispersing type hybrid position calculation method and a centralized hybrid position calculation method are used.

Figure 1:
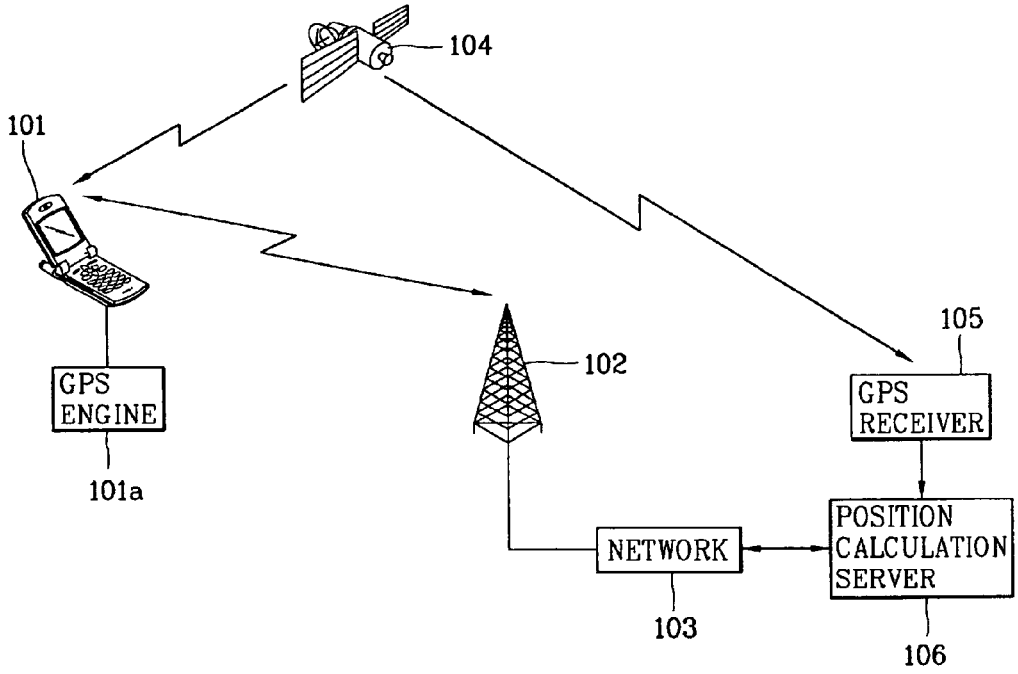
FIG. 1 BACKGROUND ART
FIG. 1 shows a conventional position determination system, in which a global positioning system (GPS) is used.
Figure 2:
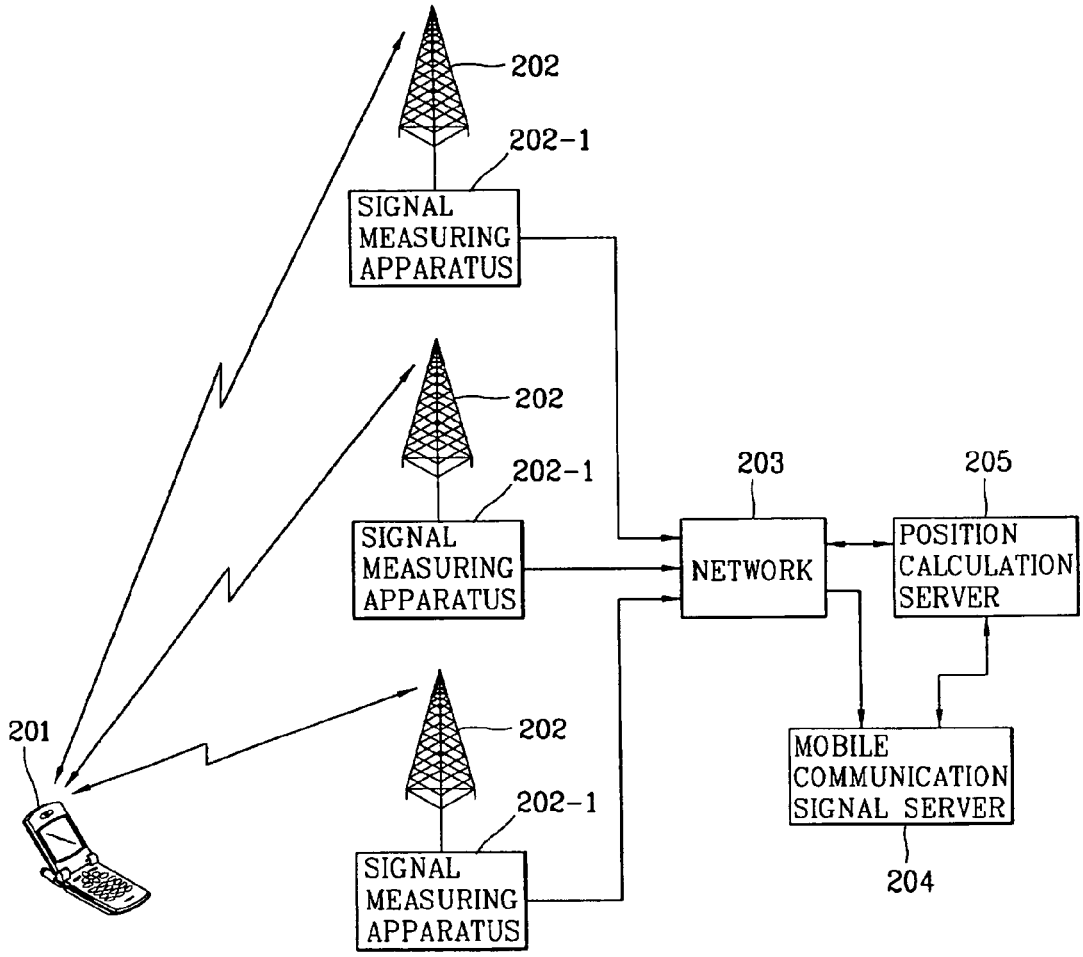
FIG. 2 BACKGROUND ART
FIG. 2 shows a conventional position determination system, in which a mobile communication signal is used.
Figure 3:
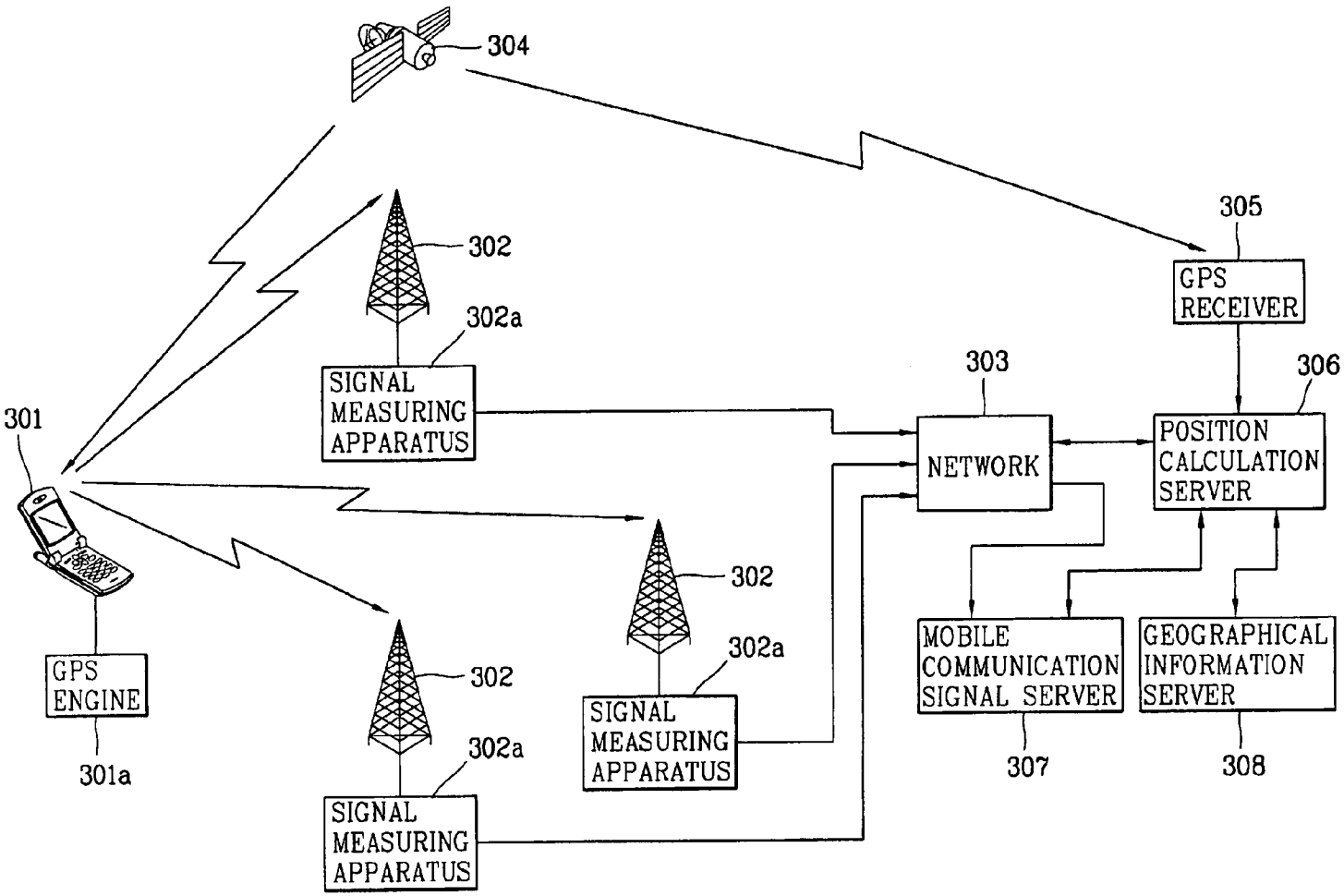
FIG. 3 shows a system for determining the position of a mobile communication terminal according to the present invention.

As shown in FIG. 3, a system for determining the position of a mobile communication terminal according to the present invention is obtained by combining a position determination system, in which the GPS is used, as shown in FIG. 1, with a position determination system, in which the mobile communication signal is used, as shown in FIG. 2.

A position calculation server 306 receives the position determination result obtained using the GPS and the position determination result, in which the mobile communication signal is used, to thus calculate the position of a mobile terminal 301 and obtains various geographical data items from a geographical information server 308 on the basis of the calculated position, to thus generate various position information items such as geographical information, lot number information, administrative area information, street information, and main building information.

The operation of the system for determining the position of the mobile communication terminal according to the present invention will now be described.

A GPS receiver 305 connected to the position calculation server 306 receives the transmission signal of a GPS satellite 304, measures error correction data for correcting the errors included in a GPS satellite signal and GPS satellite information such as a satellite orbit parameter, Doppler information, and a navigation message, and periodically outputs the error correction data and the GPS satellite information to the position calculation server 306. When a GPS engine 301a that is built-in the mobile terminal 301 requests the position calculation server 306 to provide the GPS satellite information thereto, the position calculation server 306 transmits the GPS satellite information stored in a database (DB) to the GPS engine 301a through a network 303 and a base station 302.

The GPS engine 301a calculates a pseudo range between the mobile terminal 301 and the GPS satellite 304 using the transmitted GPS satellite information such as a receivable satellite number, the satellite orbit parameter, the Doppler information, and the navigation message, measures the time information of the GPS satellite signal, and transmits the pseudo range and the time information to the position calculation server 306 together with a position calculation request signal.

At this time, signal measuring apparatuses 302a in a base station 302 receive the transmission signal of the mobile terminal 301, measure the reception angle and the delay time of the corresponding transmission signal, and transmit the measured reception angle and delay time to the network 303 together with identifier information and reference time information. The signal reception angle and the signal delay time that are transmitted through the network 303 are stored in a mobile communication signal server 307 by mobile terminals, measured times, and signal measuring apparatuses (or base stations).

Therefore, when the mobile terminal 301 requests the position calculation server 306 to calculate the position thereof, the position calculation server 306 calculates the position of the mobile terminal 301 by applying the dispersing type hybrid position calculation method and the centralized hybrid position calculation method to the pseudo range input by the GPS engine 301a and the reception angle and the delay time of the mobile communication signal provided by the mobile communication signal server 307.

When the position of the mobile terminal is calculated, the position calculation server 306 obtains various geographical information on the basis of the position calculation result such as map information, the lot number information, the administrative area information, the street information, and the main buildings, to thus generates position information, which is capable of providing various services, by applying a map match algorithm for matching the position calculation result to the map data stored in the geographical information server 308.

The position calculation method according to the dispersing type hybrid position calculation method and the centralized hybrid position calculation method will now be described in detail.

Figure 4:
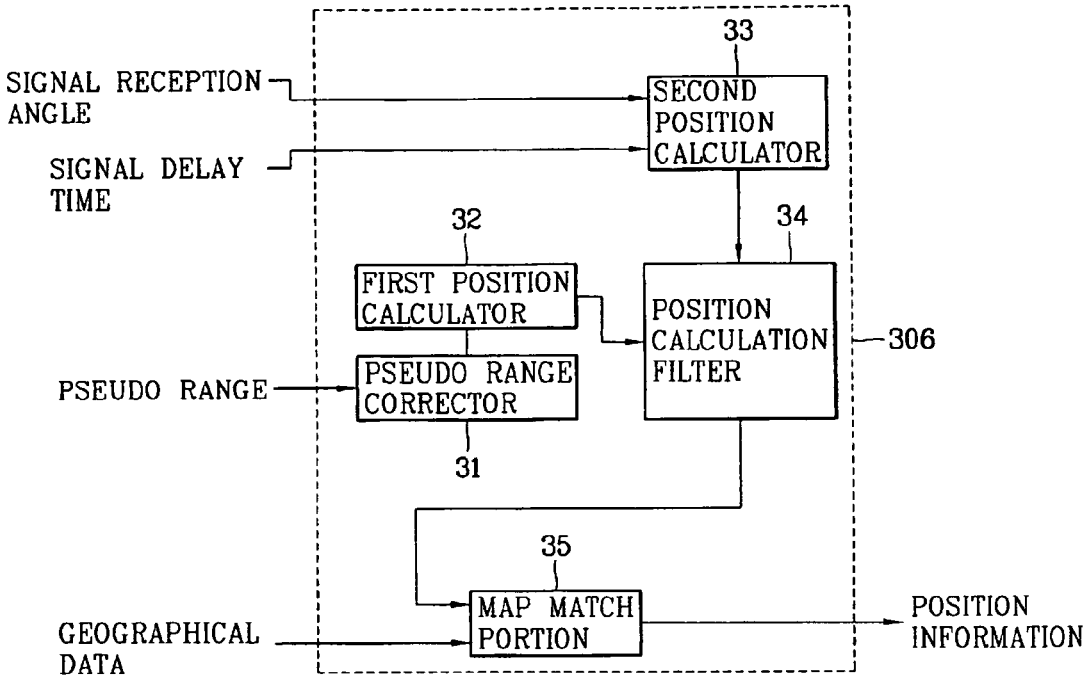
FIG. 4 schematically shows the structure of a position calculation server for explaining a dispersing type hybrid position calculation method in FIG. 3.

FIG. 4 schematically shows the structure of a position calculation server for explaining the dispersing type hybrid position calculation method.

When the position calculation server 306 is requested to calculate the position of the mobile terminal, the pseudo range corrector 31 of the position calculation server 306 corrects the errors included in the pseudo range using error correction data. A first position calculator 32 calculates the position of the mobile terminal by the GPS using the error corrected pseudo range. At this time, dispersed information on the calculation position is also calculated.

The position calculation server 306 requests the mobile communication signal server 307 to transmit data and outputs the signal reception angle and the signal delay time of the mobile communication signal input from the mobile communication signal server 307 to a second position calculator 33. The second position calculator 33 calculates the position of the mobile terminal by the mobile communication signal on the basis of the received signal reception angle and signal delay time. At this time, dispersed information on the calculation position is also calculated.

Therefore, a position calculation filter 34 calculates the optimal position of the mobile terminal 301 on the basis of the calculation results of the first and second position calculators 32 and 33. A map match portion 35 matches the geographical data stored in the geographical information server 308 to the position result calculated by the position calculation filter 34, to thus generate the position information, which is capable of providing the various geographical information services such as the map information, the lot number, the administrative area information, the street information, and the main buildings.

As mentioned above, according to the dispersing type hybrid position calculation structure, it is possible to provide the position information by calculating the position of the mobile terminal by the GPS even though it is not possible to calculate the position of the mobile terminal by the mobile communication signal. It is possible to provide the position information in the opposite case. Therefore, it is possible to provide the information on the position of the mobile terminal even though problems occur in some parts of the entire system. Accordingly, it is possible to improve the stability of the system.

Figure 5:
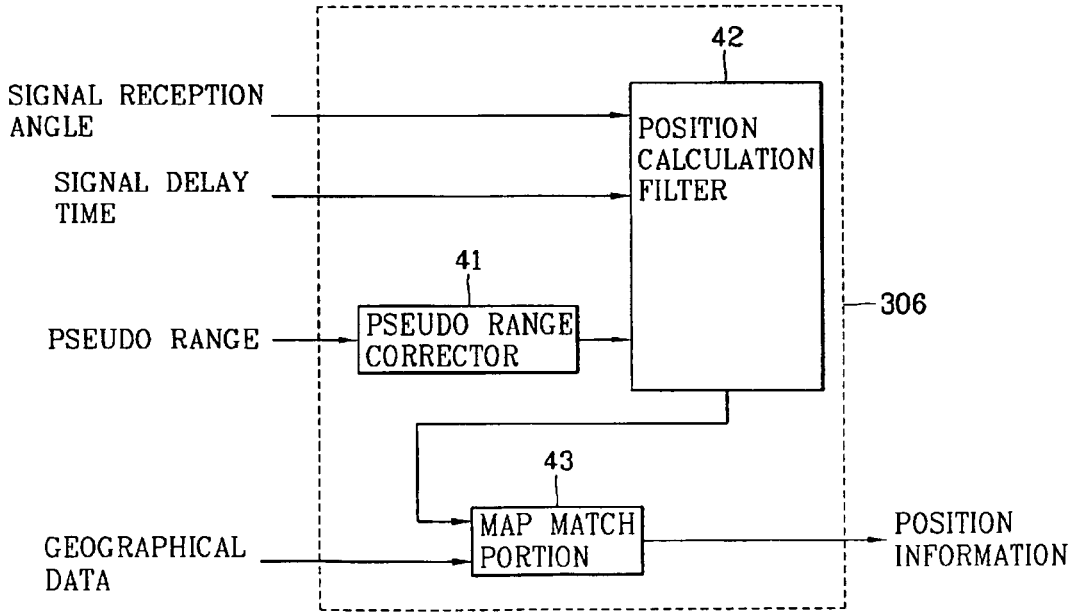
FIG. 5 schematically shows the structure of a position calculation server for explaining a centralized hybrid position calculation method in FIG. 3.

FIG. 5 schematically shows the structure of the position calculation server for explaining the centralized hybrid position calculation method.

When the position calculation server 306 is requested to calculate the position of the mobile terminal, the pseudo range corrector 41 of the position calculation server 306 corrects the errors included in the pseudo range using the error correction data provided by the mobile communication signal server 307. The position calculation server 306 requests the mobile communication signal server 307 to output the signal reception angle and the signal delay time of the mobile communication signal.

Therefore, a position calculation filter 42 receives the error corrected pseudo range, the signal reception angle, and the signal delay time and calculates the optimal position of the mobile terminal 301 using the error models and the dynamic models of the respective data items. A map match portion 43 matches the geographical data stored in the geographical information server 308 to the position result calculated by the position calculation filter 42, to thus generate the position information, which is capable of providing the various geographical information services such as map information, the lot number information, the administrative area information, the street information, and the main buildings.

As mentioned above, according to the centralized hybrid position calculation structure, it is possible to improve the correctness of the position calculation because the reception angle and the delay time of the mobile communication signal and the pseudo range by the GPS satellite signal are all used. In particular, it is possible to calculate the position of the mobile terminal even when less than three mobile communication signals and less than four pseudo ranges are received.

As mentioned above, according to the present invention, it is possible to improve the correctness of the position calculation by using the position determination system of the hybrid method obtained by combining the position determination method, in which the GPS is used, with the position determination method, in which the mobile communication signal is used, and to determine the position of the mobile terminal in all of the areas.

Also, it is possible to improve the stability of the system because it is possible to provide the position information of the mobile terminal even though the problems occur in some parts of the entire system.

According to the present invention, it is possible to provide various services such as the street information, the administrative area information, and main building information on the basis of the position information calculated by the position calculation server by combining the geographical information server with the position calculation server.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A system for determining [the] *a* position of a mobile communication terminal *transmitting a mobile communication signal*, comprising:

a global positioning system (GPS) engine, built-in [a] *the* mobile terminal, [the GPS engine] for [measuring] *receiving a transmission signal of a GPS satellite and calculating* a pseudo range between [a] *the* GPS satellite and the mobile terminal;

a *plurality of* signal measuring apparatus for measuring [the] *a* reception angle and [the] *a* delay time of [a] *the* mobile communication signal; and a position calculation server for calculating the position of the mobile terminal using the pseudo range corrected by [the] error correction data [of a] *associated with the* GPS satellite [signal] and the reception angle and the delay time of the mobile communication signal.

2. The system of claim 1, further comprising a GPS receiver for receiving *the transmission signal of* the GPS satellite [signal] and periodically outputting the error correction data and the GPS satellite data [of] *related to* the GPS satellite [signal].

3. The system of claim 1, further comprising:

a mobile communication signal server for storing the reception angle and the delay time measured by the *plurality of* signal measuring apparatus; and a geographical information server, in which various geographical data items matching a position calculation result are stored.

4. The system of claim 1, wherein the position calculation server comprises:

a pseudo range corrector for correcting [a] *the* pseudo range using the error correction data;

a first position calculator for calculating the position of the mobile terminal [by] *on the basis of* the corrected pseudo range;

a second position calculator for calculating the position of the mobile terminal using the reception angle and the delay time of the mobile communication signal;

a position calculation filter for calculating the [optimal] position of the mobile terminal on the basis of the position calculations of the first and second position calculators; and a map match portion for matching [the] geographical data of a geographical information server to the [calculation result of] *position calculated by* the position calculation filter and generating various position information items.

5. The system of claim 1, wherein the position calculation server comprises:

[the] *a* pseudo range corrector for correcting the pseudo range using the error correction data;

[the] *a* position calculation filter for calculating the position of the mobile terminal using the corrected pseudo range and the reception angle and the delay time of the mobile communication signal; and

[the] *a* map match portion for matching [the] geographical data of [the] *a* geographical information server to the [calculation result of] *position calculated by* the position calculation filter and generating [the] various position information items.

6. A system for determining [the] *a* position of a mobile terminal *transmitting a mobile communication signal*, comprising:

a mobile terminal, in which a GPS engine is loaded;

a *plurality of* signal measuring apparatus for measuring [the] *a* reception angle and [the] *a* delay time of [a] *the* mobile communication signal;

a GPS receiver for receiving [the] *a* transmission signal of a GPS satellite and [measuring the] *periodically outputting* error correction data and [the] GPS satellite data [of a] *related to the* GPS satellite [signal];

a pseudo range corrector for correcting [the] *a* pseudo range [measured] *calculated* by the GPS engine using the error correction data;

a first position calculator for calculating the position of the mobile terminal [by] *on the basis of* the corrected pseudo range;

a second position calculator for calculating the position of the mobile terminal using the reception angle and the delay time of the mobile communication signal; and a position calculation filter for calculating the [optimal] position of the mobile terminal on the basis of the [calculation results] *position calculations* of the first and second position calculators.

7. The system of claim 6, further comprising:

[the] *a* geographical information server for storing various geographical data items; and

[the] *a* map match portion for matching the geographical data of the geographical information server to the position [calculation result of] *calculated by* the position calculation filter and generating various position information items.

8. A system for determining [the] *a* position of a mobile communication terminal *transmitting a mobile communication signal*, comprising:

a mobile terminal, in which a GPS engine is loaded;

a *plurality of* signal measuring apparatus for measuring [the] *a* reception angle and [the] *a* delay time of [a] *the* mobile communication signal;

a GPS receiver for receiving [the] *a* transmission signal of a GPS satellite and [measuring the] *periodically outputting* error correction data and [the] GPS satellite data [of a] *related to the* GPS satellite [signal];

a pseudo range corrector for correcting [the] *a* pseudo range *calculated by the GPS engine* using the error correction data; and a position calculation filter for calculating the position of the mobile terminal using the corrected pseudo range and the reception angle and the delay time of the mobile communication signal.

9. The system of claim 8, further comprising:

[the] *a* geographical information server for storing various geographical data items; and

[the] *a* map match portion for matching the geographical data of the geographical information server to the position [calculation result of] *calculated by* the position calculation filter and generating various position information items.

10. A method for determining [the] *a* position of a mobile communication terminal *transmitting a mobile communication signal*, comprising the steps of:

(a) receiving a pseudo range between a GPS satellite and [a] *the* mobile terminal;

(b) receiving [the] *a* reception angle and [the] *a* delay time of [a] *the* mobile communication signal;

(c) correcting the pseudo range using [the] error correction data [of a] *related to the* GPS satellite [signal]; and (d) calculating the position of the mobile terminal using the corrected pseudo range and the reception angle and the delay time of the mobile communication signal.

11. The method of claim 10, further comprising the steps of matching the position calculation result to [the] geographical data and generating position information for providing [various] geographical information services.

12. The method of claim 10, further comprising the step of periodically receiving the error correction data and the GPS satellite [information of] *data related to* the GPS satellite [signal] from [the] *a* GPS receiver.

13. The method of claim 10, wherein the reception angle and the delay time are stored in [the] *a* mobile communication signal server.

14. [Method] *The method* of claim 10, wherein the step (d) comprises the steps of:

(d1) calculating the position of the mobile terminal [by] *on the basis of* the corrected pseudo range;

(d2) calculating the position of the mobile terminal using the reception angle and the delay time of the mobile communication signal; and (d3) calculating the [optimal] position of the mobile terminal on the basis of the calculation results obtained by the steps (d1) and (d2).

15. The method of claim 10, wherein, in the step (d3), *if* the position of the mobile communication terminal [is] *cannot be* calculated *on the basis of the calculation results obtained by steps (d1) and (d2), then the step (d) further comprises:*

[using the reception angle and the delay time of the mobile communication signal] *calculating the position of the mobile terminal on the basis of the calculation result obtained in either (d1) or (d2).*

16. A method for determining [the] *a* position of a mobile communication terminal *transmitting a mobile communication signal*, comprising the steps of:

(a) receiving a pseudo range between a GPS satellite and [a] *the* mobile terminal;

(b) receiving [the] *a* reception angle and [the] *a* delay time of [a] *the* mobile communication signal;

(c) correcting the pseudo range using [the] error correction data [of a] *related to the* GPS satellite [signal];

(d) calculating the position of the mobile terminal using the corrected pseudo range;

(e) calculating the position of the mobile terminal using the reception angle and the delay time of the mobile communication signal;

(f) calculating the [optimal] position of the mobile terminal on the basis of the calculation results obtained by the steps (d) and (e); and (g) matching the [final] position [calculation result] *of the mobile terminal* to [the] geographical data and generating position information for providing geographical information services.

*17. A mobile communication terminal comprising:*

*a global positioning system (GPS) engine, the GPS engine for measuring a pseudo range between a GPS satellite and the mobile communication terminal, the mobile communication terminal transmitting a mobile communication signal, wherein the mobile communication terminal is a part of a system comprising:*

*a plurality of signal measuring apparatus; and*

*a position calculation server for calculating the position of the mobile terminal using the pseudo range corrected by error correction data associated with the GPS satellite and a measurement associated with the plurality of signal measuring apparatus, wherein the measurement is based on information that includes a delay time of the mobile communication signal.*

*18. The mobile communication terminal according to claim 17, wherein if the position calculation server cannot use the measurement associated with the plurality of signal measuring apparatus and the corrected pseudo range for calculating the position of the mobile communication terminal, the position of the mobile communication terminal is calculated from either the measurement associated with the plurality of signal measuring apparatus or the corrected pseudo range.*

*19. The mobile communication terminal according to claim 17, wherein the system further comprises a GPS receiver for receiving a transmission signal of the GPS satellite and periodically outputting the error correction data and GPS satellite data related to the GPS satellite.*

*20. The mobile communication terminal according to claim 17, wherein the system further comprises:*

*a mobile communication signal server for storing the measurement associated with the plurality of signal measuring apparatus; and*

*a geographical information server, in which various geographical data items matching a position calculation result are stored.*

*21. The mobile communication terminal according to claim 17, wherein the position calculation server comprises:*

*a pseudo range corrector for correcting the pseudo range using the error correction data;*

*a first position calculator for calculating the position of the mobile terminal using the corrected pseudo range;*

*a second position calculator for calculating the position of the mobile terminal using the measurement associated with the plurality of signal measuring apparatus;*

*a position calculation filter for calculating the position of the mobile terminal on the basis of the position calculations of the first and second position calculators; and*

*a map match portion for matching geographical data of a geographical information server to the position calculated by the position calculation filter and generating various position information items.*

*22. The mobile communication terminal according to claim 17, wherein the position calculation server comprises:*

*a pseudo range corrector for correcting the pseudo range using the error correction data;*

*a position calculation filter for calculating the position of the mobile terminal using the corrected pseudo range and the measurement associated with the plurality of signal measuring apparatus; and*

*a map match portion for matching geographical data of a geographical information server to the position calculated by the position calculation filter and generating various position information items.*

*23. A mobile communication terminal including a GPS engine, the mobile communication terminal transmitting a mobile communication signal and being a part of a system comprising:*

*a plurality of signal measuring apparatus;*

*a GPS receiver for receiving a transmission signal of a GPS satellite and periodically outputting error correction data and GPS satellite data related to the GPS satellite;*

*a pseudo range corrector for correcting a pseudo range calculated by the GPS engine using the error correction data;*

*a first position calculator for calculating the position of the mobile communication terminal on the basis of the corrected pseudo range;*

*a second position calculator for calculating the position of the mobile communication terminal using a measurement associated with the plurality of signal measuring apparatus, wherein the measurement is based on information that includes a delay time of the mobile communication signal; and*

*a position calculation filter for calculating the position of the mobile communication terminal on the basis of the position calculations of the first and second position calculators.*

*24. The mobile communication system according to claim 23, wherein if the position calculation filter cannot use the measurement associated with the plurality of signal measuring apparatus from the second position calculator and the corrected pseudo range of the first position calculator to calculate the position of the mobile communication terminal, the position of the mobile communication terminal is calculated from either the measurement associated with the plurality of signal measuring apparatus of the second position calculator or the corrected pseudo range of the first position calculator.*

*25. The mobile communication system according to claim 23, wherein the system further comprises:*

*a geographical information server for storing various geographical data items; and*

*a map match portion for matching the geographical data of the geographical information server to the position calculated by the position calculation filter and generating various position information items.*

*26. A method for determining a position of a mobile communication terminal transmitting a mobile communication signal, comprising:*

*(a) receiving a pseudo range between a GPS satellite and the mobile terminal;*

*(b) receiving a measurement associated with a plurality of signal measuring apparatus, wherein the measurement is based on information that includes a delay time of the mobile communication signal;*

*(c) correcting the pseudo range using error correction data related to the GPS satellite; and*

*(d) calculating the position of the mobile terminal using the corrected pseudo range and the measurement associated with the plurality of signal measuring apparatus.*

*27. The method according to claim 26, further comprising matching the position calculation result to geographical data and generating position information for providing geographical information services.*

*28. The method according to claim 26, further comprising periodically receiving the error correction data and GPS satellite data related to the GPS satellite from a GPS receiver.*

*29. The method according to claim 26, wherein the measurement associated with the plurality of signal measuring apparatus is stored in a mobile communication signal server.*

*30. The method according to claim 26, wherein the step (d) comprises:*

*(d1) calculating the position of the mobile terminal on the basis of the corrected pseudo range;*

*(d2) calculating the position of the mobile terminal using the measurement associated with the plurality of signal measuring apparatus; and*

*(d3) calculating the position of the mobile terminal on the basis of the calculation results obtained by the steps (d1) and (d2).*

*31. The method according to claim 26, wherein, in the step (d3), if the position of the mobile communication terminal cannot be calculated on the basis of the calculation results obtained by steps (d1) and (d2), then the step (d3) further comprises:*

*calculating the position of the mobile terminal on the basis of the calculation result obtained in either (d1) or (d2).*

*32. The method according to claim 16, wherein, in the step (f), if the position of the mobile terminal cannot be calculated on the basis of the calculation results obtained by the steps (d) and (e), then calculating the position of the mobile terminal on the basis of the calculation result obtained in either step (d) or step (e).*

* * * * *